June 2, 1953 C. SCHAAF 2,640,689
HUMIDIFIER RADIATOR CAP
Filed March 22, 1950
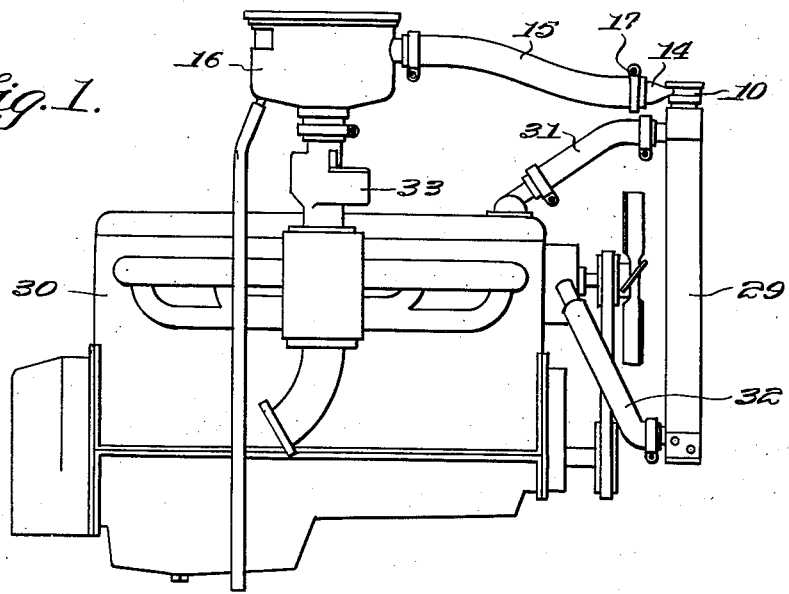
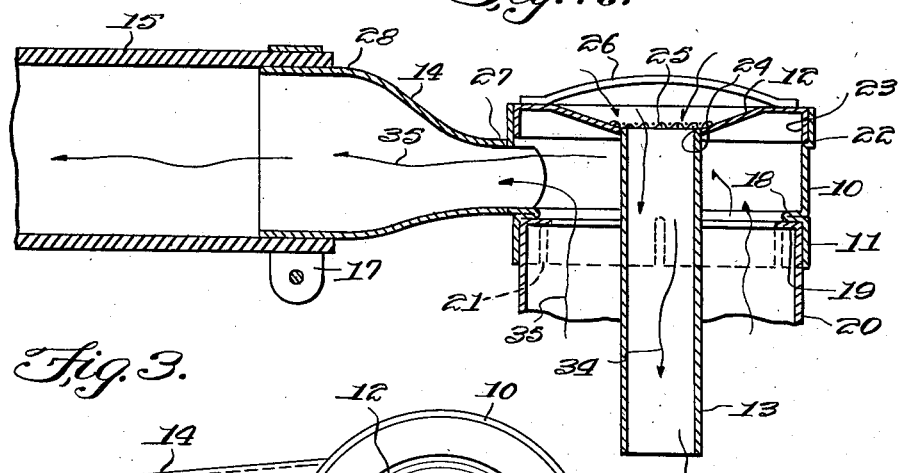
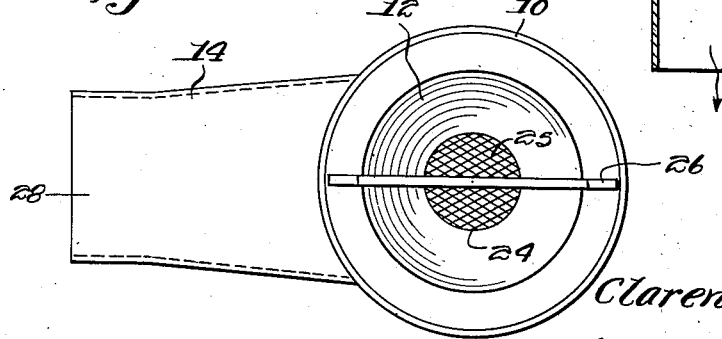
INVENTOR.
Clarence Schaaf,
BY Victor J. Evans & Co.
ATTORNEYS Patented June 2, 1953

2,640,689

UNITED STATES PATENT OFFICE 2,640,689

HUMIDIFIER RADIATOR CAP

Clarence Schaaf, Findlay, Ohio

Application March 22, 1950, Serial No. 151,205

1 Claim. (Cl. 261—121)

This invention relates to connections between air filters, cleaners, and radiators of motor vehicles, and in particular a radiator cap having a depending contractible skirt for frictionally mounting the cap on the neck of a radiator of a motor vehicle and a cover with a depending air tube extended downwardly therefrom, with the cover freely positioned in an annular recess in the upper end of the cap and in which the cap is provided with a side outlet connection through which the cap is connected to an air filter or cleaner, by a hose or the like.

The purpose of this invention is to provide means for readily connecting an air cleaner or filter to the interior of a radiator of a motor vehicle through the cap of the radiator whereby air is drawn inwardly through a continuous opening in the radiator cap and the air in combination with vapor is drawn through the cap into an air cleaner or filter in combination with a carburator of a motor vehicle engine.

Various types of connections have been provided for withdrawing vapor from radiators of motor vehicles whereby the vapor is mixed with fuel through the carburetor or air filter but it has been found difficult to provide connecting means that does not require changes in the construction of the radiator or other associated parts. With this thought in mind this invention contemplates an improved radiator cap that may be positioned on the neck of a radiator in the usual manner and in which a side connection is provided through which the vapor in combination with air is drawn into the air cleaner or filter and also in which an opening is provided to the atmosphere.

The object of this invention is, therefore, to provide means for forming a radiator cap for radiators of motor vehicles whereby the radiator is open to the atmosphere without danger of water splashing through the cap and in which the interior of the radiator is connected to an air cleaner or filter or the like through the cap.

Another object of the invention is to provide an improved radiator cap that may be positioned on radiators of motor vehicles without changing the design or arrangement of the parts of the radiator.

A further object of the invention is to provide an improved radiator cap which provides a connection between an air cleaner or filter and the interior of a radiator and also provides a continuous opening to the atmosphere, which is of a simple and economical construction.

With these and other objects and advantages in view the invention embodies a radiator cap having a cylindrical body with a depending contractible skirt for frictionally retaining the cap on the neck of a motor vehicle radiator and having a closure with a tube extended downwardly therefrom through the cap and into the radiator, and having a side outlet connection through which the interior of the radiator is connected to an air cleaner or filter or the like.

Other features and advantages of the invention will appear from the following description taken in connection with the drawings wherein:

Figure 1 is a side elevational view showing an internal combustion engine of a motor vehicle with a radiator positioned in front of the engine and with the improved radiator cap positioned on the radiator and connected to an air cleaner or filter of the engine.

Figure 2 is a vertical section through the improved radiator cap showing the side connection and air inlet tube thereof.

Figure 3 is a plan view of the improved radiator cap.

Referring now to the drawings wherein like reference characters denote corresponding parts, the improved radiator cap of this invention includes a cylindrical body 10 having a split depending contractible skirt 11 with a cover 12 having a depending tube 13 extended downwardly therefrom freely positioned in the upper end of the cylindrical body and having a side outlet connection 14 extended from one side and to which a hose 15 for connecting the radiator cap to an air cleaner or filter 16 may be attached by a clamp 17.

The casing 10 is provided with an inwardly extended annular flange 18 that is positioned to rest upon the end 19 of a radiator neck 20 and with the flange 18 seated on the end 19 the skirt 11 which is provided with spaced slits 21 fits snugly over the neck 20 whereby the cap is frictionally held on the end of the neck of the radiator.

The upper end of the cylindrical body 10 of the cap is provided with an annular recess 22 in which a flange 23 of the cover 12 is positioned and with the flange nested in the recess the cover is frictionally held in position in the upper end of the cap. The intermediate portion of the cover 12 extends downwardly as shown in Figure 2 and the tube 13 extends downwardly from a centrally positioned opening 24 in the cover to a point below the water level in the radiator so that air entering the cap 10 will pass through the water before it passes outwardly of the cap. A filtering screen 25 is positioned across the opening 24 and a handle 26 is positioned on the upper surface of the cover.

The side connection 14 extends from an opening 27 in one side of the casing 10 and, as illustrated in Figure 2 the connection 14 is formed with a flat inner end and a cylindrical outer end 28 to which the hose 15 is attached by the clamp 17. The opening 27 is high enough with relation to the water level to prevent too much water from being splashed into or drawn into the air stream.

The neck 20 extends upwardly from a radiator 29 which is connected to an engine 30 by hose connections 31 and 32 and the air cleaner or filter 16 is connected to the engine through a carburetor 33.

With the parts arranged in this manner the cover 12 may readily be removed for filling the radiator and a cylindrical casing 10 forming the body of the cap may readily be removed from the neck of the radiator for filling or cleaning, or as desired.

In operation air is drawn inwardly through the cover 12 and tube 13 as indicated by the arrows 34 and water vapor of the radiator is drawn upwardly with air therein through the cap and through the connections 14 as indicated by the arrows 35.

It will be understood that modifications may be made in the design and arrangement of the parts without departing from the spirit of the invention.

What is claimed is:

A humidifier radiator cap comprising a vertically disposed cylindrical body having its lower portion slotted vertically to provide a contractible skirt adapted to embrace the filler neck of a radiator, said body having an inner flange located immediately above the contractible skirt and adapted to rest upon the filler neck, said cap having an annular shoulder forming a recess in the upper end thereof and a side outlet connection extending therefrom at right angles thereto and above the said flange for connecting the cap to an air cleaner, a cover removably positioned in the upper end of the body upon said shoulder, said cover having a centrally located depression therein provided with a centrally disposed opening, a screen extended across the opening and secured to the cover within the depression, an air inlet tube carried by and extending downwardly from the cover in line with the opening in the cover and terminating below the said outlet connection so that air entering said air inlet tube will be mixed with the water in the radiator so that moisture laden air will pass outwardly of said cap through said outlet opening, said cover having a depending annular flange on the outer edge of the same width as the depth of the recess, and a transversely extending handle on the outer surface of said cover for the removal of the cover and tube from the body.

CLARENCE SCHAAF.

References Cited in the file of this patent

UNITED STATES PATENTS

| Number | Name | Date |
|---|---|---|
| 1,452,231 | Wells | Apr. 17, 1923 |
| 1,490,186 | Rowe | Apr. 15, 1924 |
| 1,611,530 | Judia | Dec. 21, 1926 |
| 1,784,725 | Gustafson | Dec. 9, 1930 |